(12) United States Patent
Halim et al.

(10) Patent No.: US 10,609,115 B2
(45) Date of Patent: *Mar. 31, 2020

(54) DISPLAY OF OPERATING STATUS INFORMATION OF A CLIENT IN A REMOTE DESKTOP SESSION

(71) Applicant: HEWLETT-PACKARD DEVELOPMENT COMPANY, L.P., Houston, TX (US)

(72) Inventors: Irwan Halim, Houston, TX (US); William R Whipple, Magnolia, TX (US); Norman P Brown, Tomball, TX (US)

(73) Assignee: Hewlett-Packard Development Company, L.P., Spring, TX (US)

(\*) Notice: Subject to any disclaimer, the term of this patent is extended or adjusted under 35 U.S.C. 154(b) by 106 days.

This patent is subject to a terminal disclaimer.

(21) Appl. No.: 15/827,403

(22) Filed: Nov. 30, 2017

(65) Prior Publication Data

US 2018/0084028 A1 Mar. 22, 2018

Related U.S. Application Data

(63) Continuation of application No. 14/127,706, filed as application No. PCT/US2011/042192 on Jun. 28, 2011, now Pat. No. 9,854,024.

(51) Int. Cl.
*H04L 29/08* (2006.01)
*G06F 3/14* (2006.01)
(Continued)

(52) U.S. Cl.
CPC .......... *H04L 67/025* (2013.01); *G06F 1/3203* (2013.01); *G06F 3/14* (2013.01);
(Continued)

(58) Field of Classification Search
CPC ....................................................... G06F 9/505
(Continued)

(56) References Cited

U.S. PATENT DOCUMENTS

| 5,862,404 A | 1/1999 | Onaga |
| 6,286,003 B1 | 9/2001 | Muta |

(Continued)

FOREIGN PATENT DOCUMENTS

| CN | 1204091 | 1/1999 |
| CN | 1393092 | 1/2003 |

(Continued)

OTHER PUBLICATIONS

Aquino, et al. "An intelligent web interface to generate and update adaptive virtual environments", 2010 IEEE, pp. 51-54.

(Continued)

*Primary Examiner* — Cao H Nguyen
(74) *Attorney, Agent, or Firm* — Wall & Tong LLP

(57) ABSTRACT

Example embodiments relate to the display of operating status information in a remote desktop session. In example embodiments, a client transmits operating status information to a server via a remote desktop session established with the server. In response, the client may receive graphics information including displayed status information inserted by the server based on the operating status information. Finally, the client may output the graphics information on an available display. Other embodiments relate to a corresponding server and processing performed in the server.

20 Claims, 5 Drawing Sheets

(51) Int. Cl.
*G06F 1/3203* (2019.01)
*G06F 9/451* (2018.01)

(52) U.S. Cl.
CPC .............. *G06F 9/451* (2018.02); *G06F 9/452* (2018.02); *G09G 2330/02* (2013.01); *G09G 2370/022* (2013.01)

(58) Field of Classification Search
USPC .................................................. 715/761–765
See application file for complete search history.

(56) References Cited

U.S. PATENT DOCUMENTS

| | | | |
|---|---|---|---|
| 6,437,803 | B1 | 8/2002 | Panasyuk et al. |
| 6,924,727 | B2 | 8/2005 | Nagaoka et al. |
| 7,146,229 | B2 | 12/2006 | Osaka et al. |
| 7,370,324 | B2 | 5/2008 | Goud et al. |
| 7,506,265 | B1 | 3/2009 | Traut |
| 7,681,134 | B1 | 3/2010 | Grechishkin et al. |
| 7,739,726 | B2 | 6/2010 | Iwanski et al. |
| 8,209,408 | B1 | 6/2012 | Huang |
| 8,326,449 | B2 | 12/2012 | Hartz |
| 9,009,701 | B2 | 4/2015 | Moriki |
| 9,009,706 | B1 | 4/2015 | Goyal |
| 9,075,497 | B1 | 7/2015 | Sobel |
| 2002/0073183 | A1 | 6/2002 | Yoon |
| 2004/0174866 | A1 | 9/2004 | Matsuda |
| 2004/0193461 | A1 | 9/2004 | Keohane et al. |
| 2005/0071840 | A1 | 3/2005 | Neiger et al. |
| 2006/0208871 | A1 | 9/2006 | Hansen |
| 2007/0192765 | A1 | 8/2007 | Shimogawa et al. |
| 2007/0239859 | A1 | 10/2007 | Wilkinson et al. |
| 2008/0196043 | A1 | 8/2008 | Feinlein et al. |
| 2008/0222628 | A1 | 9/2008 | Batra |
| 2009/0019436 | A1 | 1/2009 | Hartz |
| 2009/0070404 | A1 | 3/2009 | Mazzaferri |
| 2009/0150884 | A1 | 6/2009 | Fukuda |
| 2009/0183173 | A1 | 7/2009 | Becker et al. |
| 2009/0222739 | A1 | 9/2009 | Schmieder et al. |
| 2010/0077337 | A1 | 3/2010 | Yang et al. |
| 2010/0146127 | A1 | 6/2010 | Schmieder et al. |
| 2011/0004705 | A1 | 1/2011 | Kato et al. |
| 2011/0010390 | A1 | 1/2011 | Rajagopal et al. |
| 2011/0016312 | A1 | 1/2011 | Iwanski et al. |
| 2011/0153838 | A1* | 6/2011 | Belkine .................. G06F 9/505 709/227 |
| 2012/0131365 | A1 | 5/2012 | Tabone |
| 2012/0226742 | A1 | 9/2012 | Momchilov |
| 2012/0322436 | A1* | 12/2012 | Asado ................ H04W 52/143 455/422.1 |
| 2012/0324365 | A1 | 12/2012 | Momchilov |

FOREIGN PATENT DOCUMENTS

| | | |
|---|---|---|
| CN | 1630363 | 6/2005 |
| CN | 1654959 | 8/2005 |
| CN | 101944070 | 1/2011 |
| EP | 0878759 | 11/1998 |
| EP | 1233602 | 8/2002 |
| WO | WO-0193037 | 12/2001 |

OTHER PUBLICATIONS

Martinovic, et al. "Impact of the Host Operating Systems on Virtual Machine Performance", 2010, pp. 613-618.

\* cited by examiner

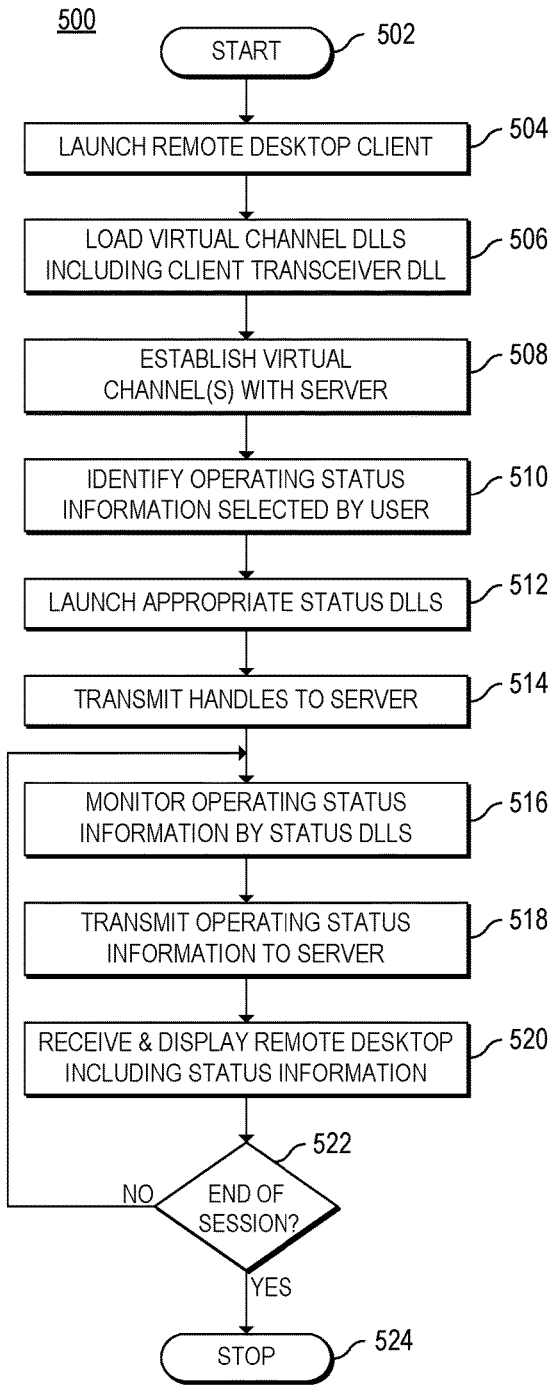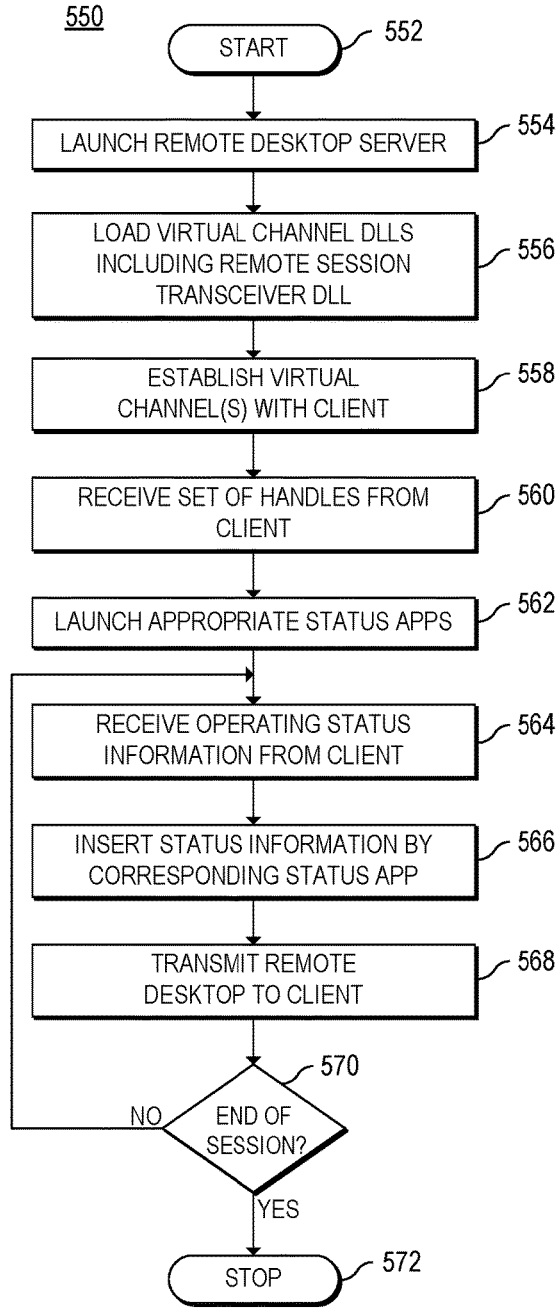
FIG. 5A
FIG. 5B

DISPLAY OF OPERATING STATUS INFORMATION OF A CLIENT IN A REMOTE DESKTOP SESSION

CROSS REFERENCE TO RELATED APPLICATIONS

This application is a continuation of recently allowed U.S. patent application Ser. No. 14/127,706, which is a National Phase Application of PCT/US2011/042192 under 35 U.S.C. § 371, which are hereby incorporated by reference in its entirety.

BACKGROUND

In a remote desktop environment, a server runs a desktop session locally and provides the outputted graphics information to a remote client for display. For example, a user of a personal computing device, such as a laptop, desktop, or thin client may connect to the server and subsequently receive a stream of graphics information representing the desktop session managed by the server. In response, the client may output the graphics on an available display and subsequently process input from the user for transmission back to the server. This process continues, with the server providing the graphics stream and the client providing input events. In this manner, the client device may interact with a user interface as if it were available locally, even though the desktop session is managed by the server.

BRIEF DESCRIPTION OF THE DRAWINGS

The following detailed description references the drawings, wherein:

FIG. 5A is a flowchart of an example method for execution by a client computing device to transmit operating status information to a server and subsequently display the operating status information within a remote desktop session;

FIG. 5B is a flowchart of an example method for execution by a server computing device to receive operating status information from a client and subsequently transmit a remote desktop including displayed operating status information to the client.

DETAILED DESCRIPTION

As detailed above, remote desktop environments enable a client to locally interact with a desktop session, even though the session is remotely managed by a server. In some remote desktop environments, the client displays the remote desktop in a full screen mode or in a size and location that obscures the system tray and other user interface elements of the host operating system (OS). In these situations, because the user is unable to observe the interface of the host OS, the user may be unaware of the conditions of the host OS and client device.

For example, suppose the battery level of the client is critically low, the wireless signal of the client has diminished, or an automatic update has triggered a reboot message with a countdown. In each of the cases, the remote desktop session may prevent the user from becoming aware of the underlying condition, such that the client may suddenly power off due to power loss or battery depletion, disconnect from the session due to inadequate wireless signal, or reboot based on the user's failure to respond to the reboot message. Each of these scenarios is problematic, as the user may lose data and become frustrated with the system. At the same time, the alternatives of periodically minimizing the remote desktop session or utilizing a smaller window reduce the quality of experience for the user.

To address these issues, example embodiments disclosed herein provide for a client-server communication mechanism by which the user may receive notifications of the local operating conditions of the client within the remote desktop session window. For example, in some embodiments, a client obtains operating status information by monitoring properties of the client, such as the battery level, wireless signal, and the like. The client may then transmit the operating status information to the server via the remote desktop session. In response, the server may receive the operating status information, insert a visible indication of the status information into the remote desktop interface, and return the desktop interface to the client via the session. Finally, the client may receive the desktop interface and output it on an available display, such that the operating conditions of the client are visible to the user within the remote desktop session window.

In this manner, example embodiments disclosed herein allow a user to monitor the status of a client device within the remote desktop session. Example embodiments thereby maintain a high quality of experience for the remote desktop session, while still allowing the user to remain aware of the battery level, wireless signal, and other conditions of the host OS and client device. Additional embodiments and advantages of such embodiments will be apparent to those of skill in the art upon reading and understanding the following description.

Figure 1:
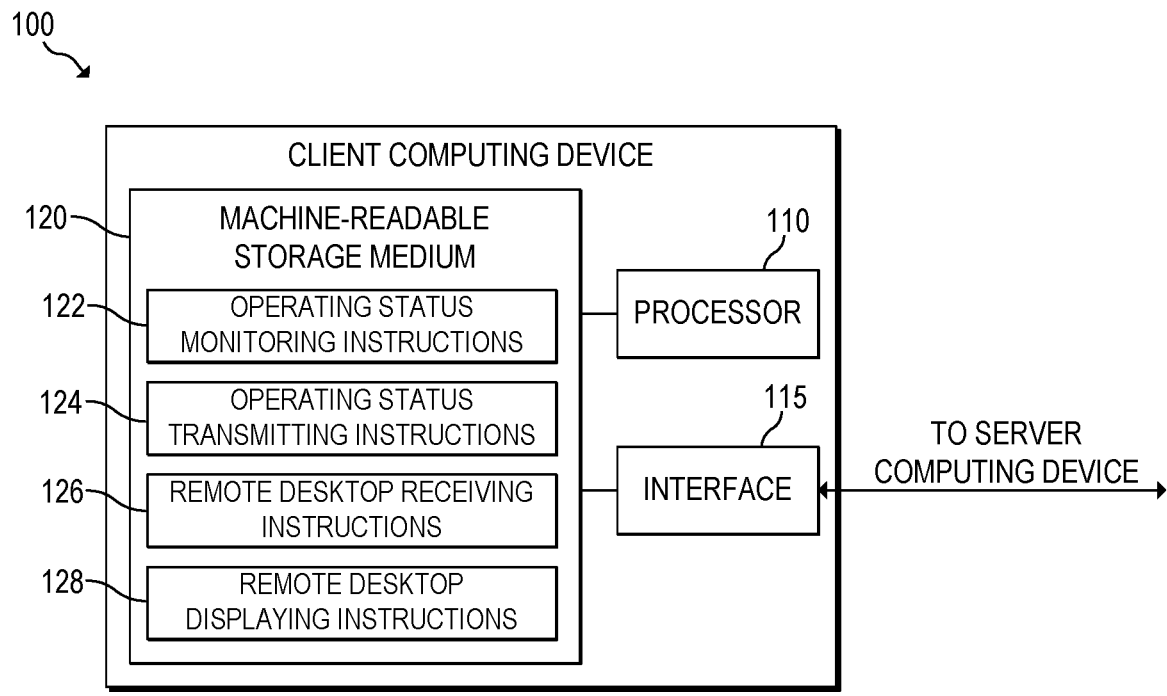
FIG. 1 is a block diagram of an example client computing device for enabling operating status information to be displayed within a remote desktop session on the client.

Referring now to the drawings, FIG. 1 is a block diagram of an example client computing device 100 for enabling operating status information to be displayed within a remote desktop session on the client. Client computing device 100 may be, for example, a notebook computer, a desktop computer, an all-in-one system, a thin client, a workstation, a tablet computing device, a mobile phone, or any other computing device suitable for execution of the functionality described below. In the implementation of FIG. 1, client computing device 100 includes processor 110, interface 115, and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to implement the procedure for displaying operating status information within a remote desktop session, as described below. As an alternative or in addition to retrieving and executing instructions, processor 110 may include one or more electronic circuits comprising a number of electronic components for performing the functionality of one or more of instructions 122, 124, 126, 128.

Figure 2:
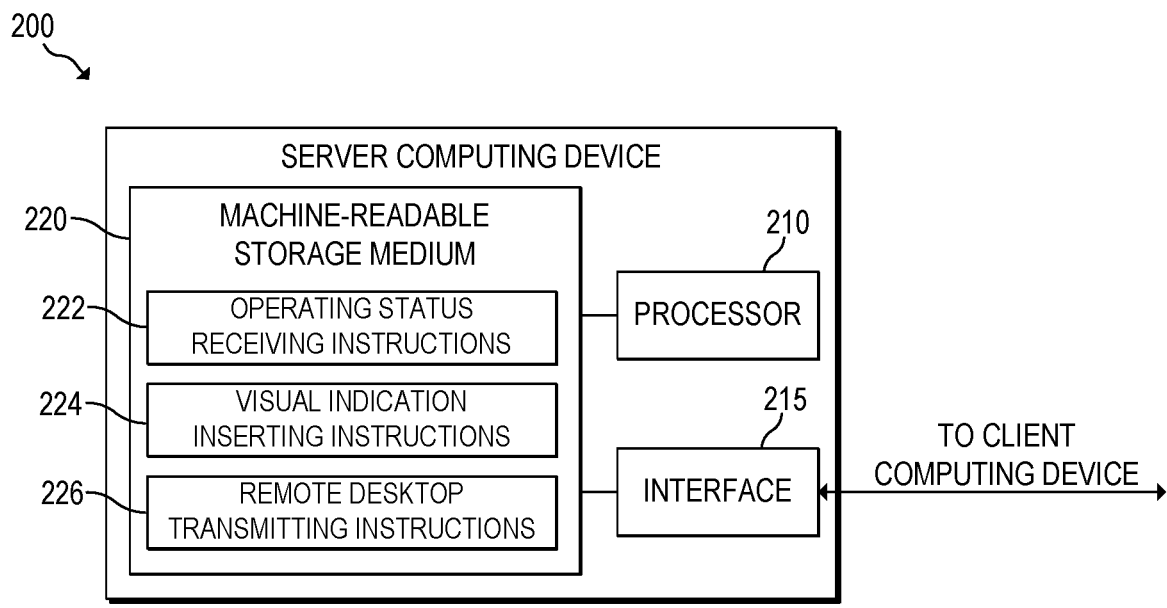
FIG. 2 is a block diagram of an example server computing device for enabling operating status information to be displayed within a remote desktop session on a connected client.

Interface 115 may include a number of electronic components for communicating with a server computing device, such as server 200 of FIG. 2. For example, interface 115 may be a wired or wireless network interface card (NIC) or other networking device suitable for communication with a corresponding server computing device. In operation, as detailed below, interface 115 may be used to transmit operating status information to the server and to receive a remote desktop from the server for output on a display device of client 100.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for transmitting operating status information to a server and receiving a remote desktop including outputted status information from the server.

Operating status monitoring instructions 122 may obtain operating status information by monitoring at least one property of client computing device 100. The operating status information may include any information related to a property of the client 100 while the client is in operation. Thus, the operating status information may describe the current status of the software of client 100, such as the operating system or another application executing within the operating system. For example, the operating status information may relate to a prompt or other message displayed by the OS or another application (e.g., a power off, reboot, or other power state message) or the current status of an application that may affect the performance of client 100 (e.g., the status of a virus or malware scan). Similarly, the operating status information may describe the current status of hardware of client 100, such as a battery, network device, processor, memory, or any other hardware component. For example, the operating status information may relate to the battery level, availability of an Alternating Current (AC) power source, wireless signal strength, current memory or processor usage, audio volume, or any other hardware property.

Monitoring instructions 122 may obtain the operating status information using a number of techniques. In some implementations, monitoring instructions 122 may monitor predetermined messages exchanged within the OS of client 100. For example, a Basic Input/Output System (BIOS) may provide messages relating to the hardware of client 100 to the OS and monitoring instructions 122 may detect these messages and extract the required information. Similarly, monitoring instructions 122 may intercept or otherwise access messages exchanged between components of the OS of client 100 or exchanged between the OS and applications executing within the OS, such as a message to display a user interface element (e.g., a pop-up message) or a message used to update a system tray element. It should be noted, however, that alternative monitoring techniques may be utilized, provided that monitoring instructions 122 are able to gather the required operating status information.

In some embodiments, the particular information to be monitored may be identified by the user. For example, client computing device 100 may output a user interface that allows a user to select the particular types of information of interest to the user. Monitoring instructions 122 may then obtain the requested information by monitoring for only the operating status information requested by the user. For example, when monitoring messages that are exchanged within the OS of client 100, monitoring instructions 122 may determine which messages to access based on the user selection of the operating status information of interest.

After monitoring instructions 122 obtain the operating status information, operating status transmitting instructions 124 may transmit the operating status information to a server computing device via a remote desktop session established with the server. The remote desktop session may be any communication session in which client computing device 100 receives a graphical user interface of a desktop from a server computing device. For example, the remote desktop session may be established according to the Microsoft Remote Desktop Protocol (RDP), the Citrix Independent Computing Architecture (ICA), or the Teradici Personal Computer over Internet Protocol (PCoIP) protocol.

The mechanism used by transmitting instructions 124 for transmission of the operating status information may vary by embodiment. For example, in some implementations, transmitting instructions 124 may utilize a virtual channel established between interface 115 of client 100 and a corresponding interface of a server. In some implementations, this virtual channel may be a dedicated channel, such that only operating status information is transmitted via the particular channel.

Regardless of the transmission mechanism, transmitting instructions 124 may include an identification of the type of operating status information (e.g., an identifier, handle, etc.), such that the server is able to identify the transmitted information. Transmitting instructions 124 may then include the actual status information in association with the identification of the type. For example, transmitting instructions 124 may transmit the information as an alphanumeric string, number, or in any other format, provided that the server is preconfigured to read the status information in the selected format.

Subsequent to transmission of the operating status information to the server, remote desktop receiving instructions 126 may receive a remote desktop for display that includes displayed status information inserted by the server based on the operating status information. For example, the remote desktop may comprise graphics information that includes displayed status information, such as a dialog, notification, icon, text, or other interface element corresponding to the status information obtained by monitoring instructions 122 and transmitted by transmitting instructions 124. Additional details regarding the insertion of displayed status information by the server are provided below in connection with server computing device 200 of FIG. 2.

Finally, upon receipt of the remote desktop, remote desktop displaying instructions 128 may display the remote desktop including the displayed status information within the window of the remote desktop session on the client. For example, a graphics interface of client 100 may output the received graphics information to an available display device, such as an integrated or external display. Based on repeated execution of instructions 122, 124, 126, 128, client computing device 100 may thereby continuously monitor for operating status information and display the status information within the remote desktop session.

FIG. 2 is a block diagram of an example server computing device 200 for enabling operating status information to be displayed within a remote desktop session on a connected client. Server computing device 200 may be any device suitable for locally executing a desktop session and transmitting the session for display on a client. In the implementation of FIG. 2, server computing device 200 includes processor 210, interface 215, and machine-readable storage medium 220.

As with processor 110 of FIG. 1, processor 210 may be any hardware device suitable for retrieval and execution of instructions stored in machine-readable storage medium 220 and/or electronic circuitry for performing the functionality of instructions 222, 224, 226. Similarly, as with interface 115 of FIG. 1, interface 215 may be any electronic components for communicating with a client computing device, such as a wired or wireless network interface card. Finally, as with storage medium 120 of FIG. 1, machine-readable storage medium 220 may be any electronic, magnetic, optical, or other physical storage device that contains or stores executable instructions, such as instructions 222, 224, 226.

During execution of a remote desktop session, operating status receiving instructions 222 may receive operating status information from a client via the remote desktop session. For example, as detailed above, the client may send information regarding its operating parameters via a virtual channel or other transmission mechanism. Receiving instructions 222 may then parse the received status information based on the type identifier and corresponding information transmitted by the client.

After receipt of the operating status information, visual indication inserting instructions 224 may then insert a visual indication of the operating status information into a remote desktop GUI. For example, inserting instructions 224 may be configured to read the received operating status information and display an appropriate visual representation of each type of operating status information within the remote desktop that is transmitted to the client for display.

Inserting instructions 224 may display any visual indication of the operating status information provided that the indication is sufficient for the user of the client to observe the indication within the remote desktop session. For example, if the operating status information is the battery level, wireless signal, or available computing resources, inserting instructions 224 may output an icon or other graphic representing the resource and its current level, a percentage as a number, a pie chart or graph, a text notification, and the like. As another example, if the operating status information represents a user interface element, such as a reboot dialog box, inserting instructions 224 may insert a similar or identical interface element into the remote desktop. In such cases, as detailed below in connection with FIG. 3, the user may select the user interface element within the remote desktop session and transmit the input back to server 200.

Finally, remote desktop transmitting instructions 226 may transmit the remote desktop GUI including the inserted visual indication to the client for display by the client. For example, transmitting instructions 226 may compress and packetize the remote desktop and transmit it to the client via a virtual channel or other transmission mechanism.

Figure 3:
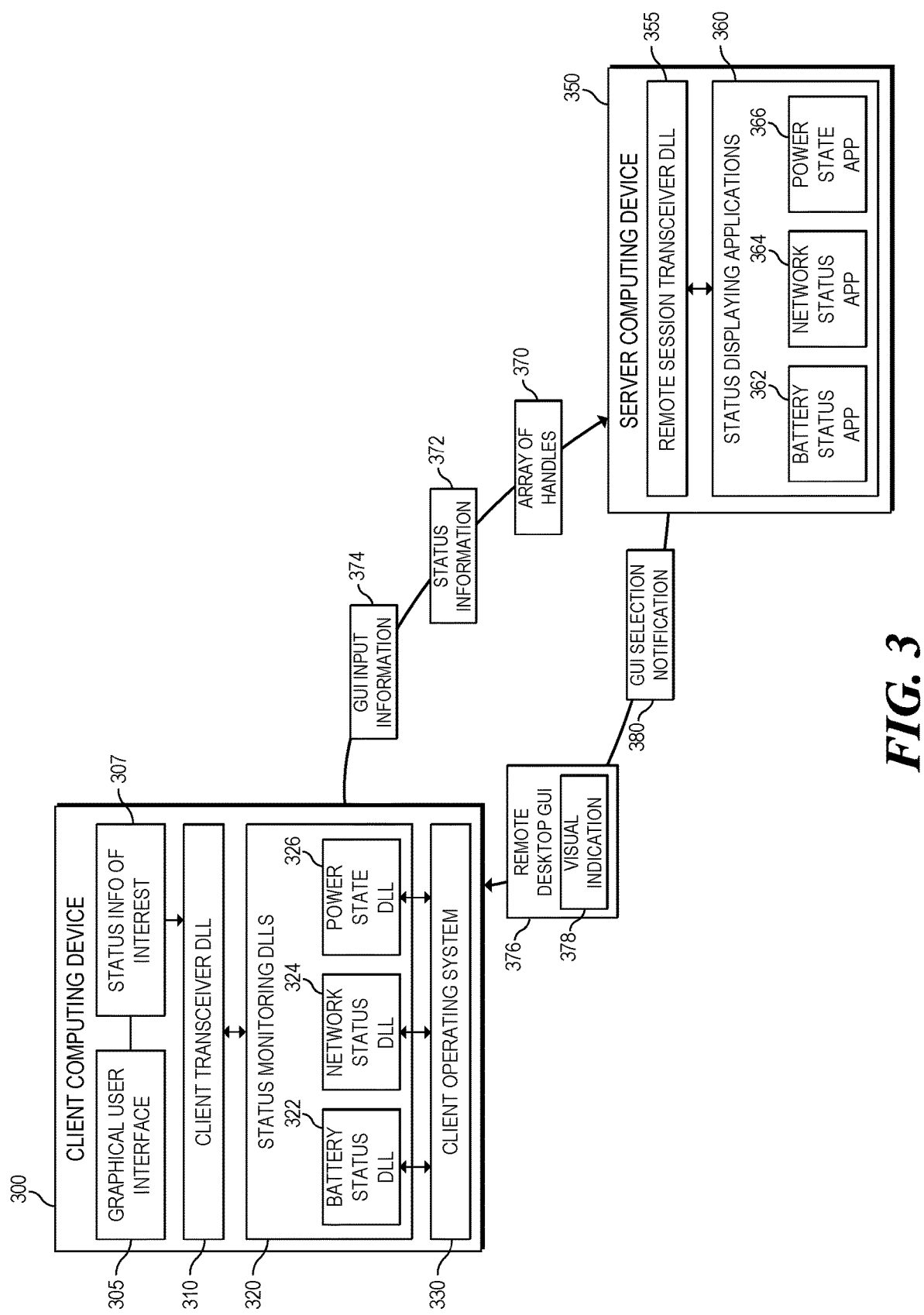
FIG. 3 is a block diagram of an example client computing device in communication with a server computing device for allowing operating status information to be displayed on the client within a remote desktop session.

FIG. 3 is a block diagram of an example client computing device 300 in communication with a server computing device 350 for allowing operating status information 372 to be displayed on the client 300 within a remote desktop session. As detailed below, client 300 may be in communication with server 350 to transmit operating status information 372 and, in response, receive a remote desktop GUI 376 including a visual indication 378 of the status information for output on an available display.

As illustrated, client computing device 300 may include a graphical user interface 305, status information of interest 307, a client transceiver Dynamic Link Library (DLL) 310, a plurality of status monitoring DLLs 320, and a client operating system 330. In some implementations, graphical user interface 305, DLLs 310, 320, and client OS 330 may be implemented as a series of instructions encoded on a storage medium and executed by a processor of client 300. Note that, although described below as dynamic link libraries, the functionality of DLLs 310, 320 may be implemented as another type of library, as an executable application, or as any other set of executable instructions.

Client 300 may display graphical user interface 305, which may be configured to receive a user selection of operating status information to be monitored and displayed within the remote desktop session. For example, GUI 305 may display a listing of operating status information that can be monitored and corresponding selection interface elements, such as a group of checkboxes. The user may select the operating status information of interest, which may then be stored as status information of interest 307 for subsequent access by client transceiver DLL 310.

Client transceiver DLL 310 may comprise a set of instructions for managing the collection and display of operating status information of client 300. Upon initialization of the remote desktop session, transceiver DLL 310 may establish a virtual channel or other communication mechanism with remote session transceiver DLL 355 of server 350. Transceiver DLL 310 may then launch status monitoring DLLs 320 according to the user selections stored in status information of interest 307, such that a separate DLL 322, 324, 326 is loaded to monitor messages for each type of operating status information. For example, suppose the user has indicated interest in receiving status information regarding the battery, wireless signal, and power states of client 300. In response, client transceiver DLL 310 may launch battery status DLL 322, network status DLL 324, and power state DLL 326, each corresponding to one of the user-selected types of operating status information.

After launching the appropriate status monitoring DLLs, transceiver DLL 310 may receive, from each monitoring DLL 320, a predetermined handle that uniquely identifies the status information that the corresponding DLL 320 will gather. The handle may be, for example, a string of alphanumeric characters, an integer, or any other information sufficient to uniquely identify a type of operating status information. Client transceiver DLL 310 may then transmit an array of handles 370 to server 350. In response, as described in further detail below, remote session transceiver DLL 355 may launch the corresponding status displaying applications 360 to process the operating status information to be subsequently transmitted to the server 350.

During operation, each status monitoring DLL 320 may monitor for a given type of operating status information of client 300. In particular, each monitoring DLL 320 may gather information in the manner described above in connection with monitoring instructions 122 of FIG. 1. For example, each monitoring DLL 320 may be configured to monitor messages exchanged within client operating system 330 that relate to the particular type of information to be monitored. Continuing with the previous example, battery status DLL 322 may monitor the level of charge of the battery, network status DLL 324 may monitor the level of wireless signal, and power state DLL 326 may monitor for messages related to the operating mode of client 300 (e.g., a reboot or shutdown dialog box displayed in OS 330).

Upon gathering the required information, each monitoring DLL 320 may provide the status information to client transceiver DLL 310 along with a corresponding handle. In response, client transceiver DLL 310 may then forward the gathered operating status information 372 to remote session transceiver DLL 355. When transmitting status information 372, client transceiver DLL 310 may also include the corresponding handle that identifies the particular type of operating status information.

As illustrated, server computing device 350 may include a remote session transceiver DLL 355 and status displaying applications 360. In some implementations, DLL 355 may be implemented as a series of instructions encoded on a storage medium and executed by a processor of server 350. Note that, although described below as a dynamic link library, the functionality of DLL 355 may be implemented as another type of library, as an executable application, or as any other set of executable instructions.

Remote session transceiver DLL 355 may comprise a set of instructions for managing receipt and display of operating status information 372 collected by client 300. Upon initialization of the remote desktop session, transceiver DLL 355 may establish a virtual channel or other communication mechanism with client transceiver DLL 310. Transceiver DLL 355 may then receive an array of handles 370 from client 300, where each handle identifies a corresponding type of operating status information to be transmitted to server 350. In response, transceiver DLL 355 may then load a respective process 360 for each handle to manage the process for receiving the operating status information 372 and outputting a visual indication 378 corresponding to the status information.

Continuing with the example above, suppose that client 300 has launched battery status DLL 322, network status DLL 324, and power state DLL 326. In response to receipt of the handles 370 identifying the operating status information, transceiver DLL 355 may read the handles and, in response, launch battery status application 362, network status application 364, and power state application 366.

During operation, each status displaying application 360 may receive operating status information 372 forwarded by transceiver DLL 355 based on the handle associated with the status information. In response, each application 360 may then output a visual indication 378 of the operating status information in the manner described above in connection with visual indication inserting instructions 224 of FIG. 2. For example, battery status application 362 may display information regarding the level of charge of the battery, network status application 364 may display information regarding the level of wireless signal, and power state application 366 may display a dialog box or other interface element corresponding to a power state message. After insertion of the visual indication 378 for each type of operating status information, server 350 may then transmit the remote desktop GUI 376 to client 300 for display.

In some embodiments, the transmitted remote desktop GUI 376 may include a visual indication 378 that is capable of receiving user input within the remote desktop session. For example, suppose the status information 372 transmitted by client 300 identifies an interface element displayed in OS 330, but currently obscured by the remote desktop session, such as a pop-up message, a volume control interface element, or any other interface element that receives user input. In response, the corresponding status displaying application 360 may insert a selectable user interface element into the remote desktop GUI 376 as the visual indication 378.

Upon selection, modification, or other interaction with the indication 378 by the user within the remote desktop session window, the GUI input information 374 transmitted by client 300 may identify the window within the remote desktop session and include an indication that the interface element has been selected, modified, or otherwise interacted with. Next, in response to receipt of this indication, server 350 may transmit a GUI selection notification 380 to client 300 identifying the window within client OS 330 and indicating that the interface element was selected, modified, or otherwise interacted with within the remote desktop session. Finally, based on the GUI selection notification 380, client 300 may forward the indication to the appropriate window within client OS 330, such that client 300 may activate or modify the obscured user element outside of the remote desktop session.

To give more details regarding a specific example, suppose client 300 has installed an automatic update in client OS 330 and an automatic reboot message with a countdown has been displayed on the client 300, but is currently obscured by the remote desktop session window. Further suppose that the user is given the option of selecting "Yes" to continue with a reboot or "No" to postpone the reboot. In response, client 300 may transmit status information 372 to server 350 that identifies the message and the input requested.

Power state application 366 may then receive notification of the reboot message and, in response, output a similar message within remote desktop GUI 376, such that the message is displayed within the remote desktop session window on client 300 and is therefore visible to the user. Upon user selection of either "Yes" or "No" within the remote desktop session window, client 300 may return GUI input information 374 identifying the interface element within the remote desktop session and the selected response. In response to input information 374, the server 350 may return a selection notification 380 to the client 300 identifying the window within OS 330 and the selected response. Finally, client 300 may return the response to the identified window outside of the remote desktop session, such that the reboot of client 300 is either triggered or postponed without requiring the user to minimize the remote desktop session.

Figure 4A:
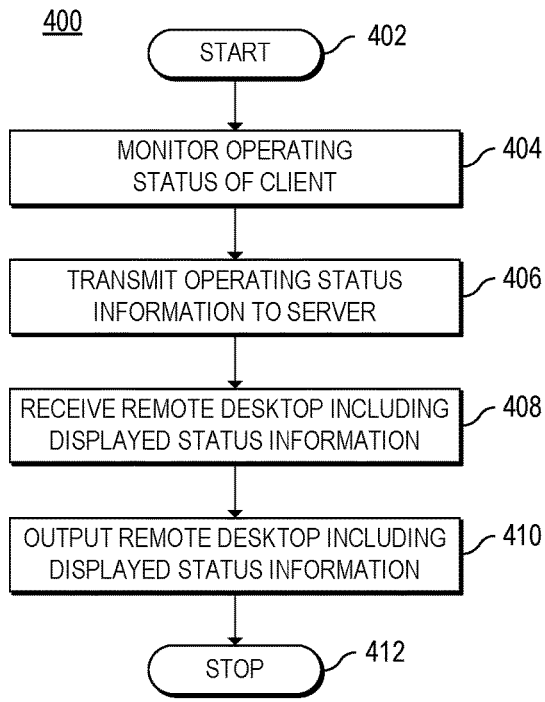
FIG. 4A is a flowchart of an example method for execution by a client computing device to transmit operating status information to a server and subsequently display the operating status information within a remote desktop session.
Figure 4B:
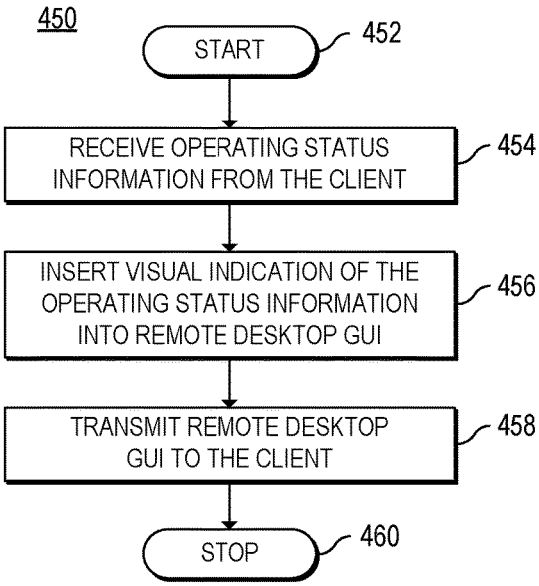
FIG. 4B is a flowchart of an example method for execution by a server computing device to receive operating status information from a client and subsequently transmit a remote desktop including displayed operating status information to the client.

FIGS. 4A & 5A are flowcharts of example methods 400, 500 for execution by client computing devices 100 and 300, respectively. Similarly, FIGS. 4B & 5B are flowcharts of example methods 450, 550 for execution by server computing devices 200 and 350, respectively. Although execution of methods 400, 450, 500, 550 is described below with reference to these computing devices, other suitable components for execution of the methods will be apparent to those of skill in the art. Methods 400, 450, 500, 550 may be implemented in the form of instructions executable by a processor and/or in the form of electronic circuitry.

FIG. 4A is a flowchart of an example method 400 for execution by a client computing device 100 to transmit operating status information to a server and subsequently display the operating status information within a remote desktop session. Method 400 may start in block 402 and proceed to block 404, where client 100 may begin monitoring operating status information regarding the operation of client 100. For example, one or more processes within client 100 may monitor messages exchanged within an OS of the client 100 and thereby extract operating status information of interest.

Next, in block 406, client 100 may transmit the operating status information to a server via a remote desktop session established with the server. For example, client 100 may transmit the operating status information via a virtual channel within the remote desktop session.

In response, in block 408, client 100 may then receive a remote desktop transmitted by the server. The remote desktop may include displayed status information inserted by the server based on the operating status information transmitted in block 406. For example, as detailed below in connection with block 456 of FIG. 4B, the server may insert a visual representation of each type of status information, such as an icon, text, interface element, etc. Finally, in block 410, client 100 may output the received remote desktop including the displayed status information within the remote desktop session window. Blocks 404 to 410 may then be repeated until the remote desktop session is ended, at which point method 400 may stop in block 412.

FIG. 4B is a flowchart of an example method 450 for execution by a server computing device 200 to receive operating status information from a client and subsequently transmit a remote desktop including displayed operating status information to the client. Method 450 may start in block 452 and proceed to block 454, where server 200 may receive operating status information from the client. For example, server 200 may receive the information via a virtual channel established for a remote desktop session with the client. In some cases, the received information may correspond to information currently displayed on the client, but obscured by the remote desktop session window.

Next, in block 456, server 200 may insert a visual indication of the operating status information into the remote desktop GUI. For example, server 200 may read the received operating status information and display an appropriate visual representation for each type of received information. The displayed indication may be, for example, an icon, a percentage as a number, a pie chart or graph, a text notification, or any other visual representation of the operating status information.

Finally, in block 458, server 200 may transmit the remote desktop GUI including the visual indication to the client for output by the client within the remote desktop session window. Blocks 454 to 458 may then be repeated until the remote desktop session is ended, at which point method 450 may stop in block 460.

FIG. 5A is a flowchart of an example method 500 for execution by a client computing device 300 to transmit operating status information to a server 350 and subsequently display the operating status information within a remote desktop session. Method 500 may start in block 502 and proceed to block 504, where client 300 may launch a remote desktop client. The remote desktop client may be any application suitable for communicating with a server 350 using RDP, ICA, PCoIP, or another protocol to receive a remote desktop from the server 350 and to transmit input information to the server 350.

In block 506, upon initialization of the client application and after connecting with the server 350, client 300 may then load all registered virtual channel DLLs, including a client transceiver DLL 310. In block 508, each loaded DLL may then establish a virtual channel with a corresponding DLL executing on server 350. Thus, client transceiver DLL 310 may establish a virtual channel with remote session transceiver DLL 355.

In block 510, client transceiver DLL 310 may then determine the status information of interest to the user based on the user's selections in a graphical user interface 305. Based on the status information of interest 307, client transceiver DLL 310 may then launch the appropriate status monitoring DLLs 320 in block 512. For example, client transceiver DLL 310 may launch a battery status DLL 322, a network status DLL 324, and a power state DLL 326. Each status monitoring DLL 320 may then return a handle and, in block 514, client transceiver DLL 310 may transmit the handles to the server 350.

After initializing the remote desktop session and corresponding DLLs in blocks 504 to 514, client 300 may begin monitoring operating status information in block 516. For example, each status monitoring DLL 320 may monitor messages exchanged within the OS 330 of client 300 and may thereby extract the appropriate operating status information. Each monitoring DLL 320 may then return the status information along with a corresponding handle to client transceiver DLL 310.

In block 518, client transceiver DLL 310 may then transmit the operating status information including each handle to server 350. In response, in block 520, client 300 may receive a remote desktop including displayed status information inserted by the server 350. The remote desktop client may then output the received remote desktop in the remote desktop session window.

In block 522, the remote desktop client may determine whether the remote desktop session has ended. If the session is still in operation, method 500 may return to block 516, where client 300 may continue monitoring for operating status information. Otherwise, if the remote desktop session has ended, method 500 may continue to block 524, where method 500 may stop.

FIG. 5B is a flowchart of an example method 550 for execution by a server computing device 350 to receive operating status information from a client 300 and subsequently transmit a remote desktop including displayed operating status information to the client 300. Method 550 may start in block 552 and continue to block 554, where server 350 may launch a remote desktop server. The remote desktop server may be any application suitable for communicating with a client 300 using an appropriate protocol to transmit a remote desktop to the client 300 and to receive input information from the client 300.

In block 556, upon initialization of the server application and after connecting with the client 300, server 350 may then load all registered virtual channel DLLs, including a remote session transceiver DLL 355. In block 558, each loaded DLL may then establish a virtual channel with a corresponding DLL executing on client 300. Thus, remote session transceiver DLL 355 may establish a virtual channel with client transceiver DLL 310.

In block 560, remote session transceiver DLL 355 may then receive handles from client 300 that represent the status monitoring DLLs launched on client 300. In response, in block 562, transceiver DLL 355 may then launch the status monitoring applications 360 that correspond to the received handles. For example, if the handles indicate that client 300 has launched battery status DLL 322, network status DLL 324, and power state DLL 326, server 350 may launch battery status application 362, network status application 364, and power state application 366.

After initializing the remote desktop session and corresponding DLLs in blocks 554 to 562, server 350 may begin receiving operating status information in block 564. For example, remote session transceiver DLL 355 may receive operating status information with an associated handle and forward the information to the appropriate status displaying application 360 based on the handle.

Next, in block 566, each status displaying application 360 may output an indication of the received operating status information in the remote desktop. For example, each application 360 may output a dialog, icon, text, or any other visual representation of the status information. In block 568, server 350 may then transmit the remote desktop including the displayed status information to client 300 for display in the remote desktop session.

In block 570, the remote desktop server may determine whether the remote desktop session has ended. If the session is still in operation, method 550 may return to block 564, where server 350 may continue processing received operating status information. Otherwise, if the remote desktop session has ended, method 550 may continue to block 572, where method 550 may stop.

Figure 6:
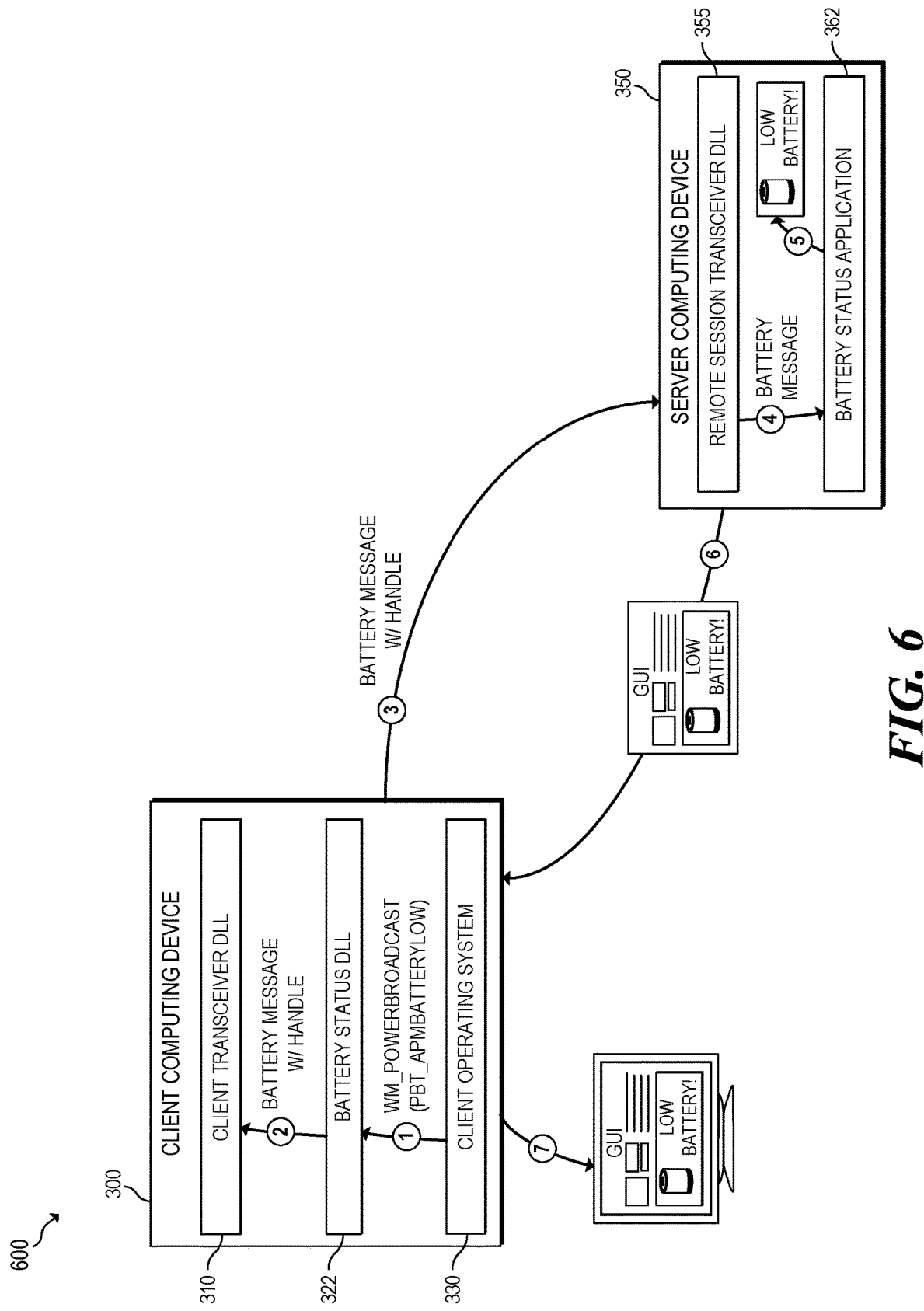
FIG. 6 is a block diagram of an example sequence of operations for displaying battery status information of a client computing device within a remote desktop session.

FIG. 6 is a block diagram of an example sequence of operations 600 for displaying battery status information of a client computing device 300 within a remote desktop session. Although described below with reference to the components of FIG. 3, it should be noted that sequence 600 may be applicable to any remote desktop session including a client in communication with a server. In the description that follows, it is assumed that client 300 and server 350 have initialized a remote desktop session and the required components for exchanging operating status information.

As illustrated, the sequence may start in block 1, where battery status DLL 322 may detect a message broadcast within OS 330 to indicate the status of the battery. For example, in the Microsoft Windows® operating system, when the OS 330 determines that the battery is at a low level, it generates a WM_POWERBROADCAST message with one of the parameters set to PBT_APMBATTERYLOW. Each application running within the OS 330 can thereby receive this message and determine that the battery is at a low level. In this instance, battery status DLL 322 receives the message and, in block 2, therefore transmits a battery message along with a corresponding handle (e.g., "BATT_STATUS") to client transceiver DLL 310. In block 3, client transceiver DLL 310 forwards the message with the handle to server computing device 350.

In block 4, remote session transceiver DLL 355 receives the operating status information, detects the handle (e.g., "BATT_STATUS"), and therefore forwards the message to battery status application 362. In block 5, battery status application 362 parses the message, determines that the battery is low, and therefore outputs a message with an icon to the remote desktop GUI. In block 6, server computing device 350 returns the remote desktop GUI including the inserted status information. Finally, in block 7, client computing device 300 displays the received remote desktop within the remote desktop session window.

According to the foregoing, example embodiments disclosed herein enable a remote desktop client to receive and display information regarding its operating status within a remote desktop session window. In this manner, the user may remain aware of the status of the operating system, applications, and hardware of the client without having to minimize or otherwise interfere with the remote desktop session. Example embodiments thereby provide users with a remote desktop experience that more closely emulates the experience of a local desktop.

We claim:

1. A client computing device comprising:
a processor to:
transmit operating status information of the client computing device to a server via a remote desktop session established with the server, wherein the operating status information corresponds to an interface element displayed on the client computing device that is currently obscured by the remote desktop session;
receive graphics information from the server via a channel that is dedicated to transmitting the operating status information, the graphics information including displayed status information inserted by the server based on the operating status information; and
output the graphics information including the displayed status information within a window of the remote desktop session that obscures the interface element on a display available to the client computing device.

2. The client computing device of claim 1, wherein the operating status information includes one or more of battery status information, network status information, and power state information.

3. The client computing device of claim 1, wherein the processor is further to:
transmit at least one handle to the server upon initiation of the remote desktop session, each handle identifying a particular type of operating status information to be subsequently transmitted to the server; and
include a particular handle when transmitting the operating status information to the server, the included handle identifying the particular type of operating status information.

4. The client computing device of claim 1, wherein the processor is further to:
obtain the operating status information by monitoring predetermined messages exchanged within an operating system of the client computing device.

5. The client computing device of claim 4, wherein the processor is to access the predetermined messages based on a user selection of operating status information of interest to the user.

6. The client computing device of claim 4, wherein the processor is to load a separate Dynamic Link Library (DLL) to monitor the predetermined messages for each type of operating status information.

7. The client computing device of claim 1, wherein:
the displayed status information includes a selectable user interface element corresponding to the interface element currently obscured on the client computing device by the remote desktop session, and
the processor is further to:
transmit, to the server, an indication that the selectable user interface element has been selected;
receive a returned notification from the server indicating that the selectable user interface element has been selected in the remote desktop session; and
activate the obscured user interface element based on the returned notification.

8. A non-transitory machine-readable storage medium encoded with instructions executable by a processor of a client computing device, the machine-readable storage medium comprising: instructions to obtain operating status information by monitoring at least one property of the client computing device, wherein the operating status information corresponds to an interface element displayed on the client computing device that is currently obscured by a remote desktop session established with a server;

instructions to transmit the operating status information to the server via a channel of the remote desktop session, wherein the channel is dedicated to transmitting the operating status information;

instructions to receive a remote desktop for display, the remote desktop including displayed status information inserted by the server based on the operating status information; and instructions to display the remote desktop including the displayed status information in a window of the remote desktop session that obscures the interface element.

9. The non-transitory machine-readable storage medium of claim 8, further comprising:

instructions to display a user interface that includes the selectable user interface element, the user interface configured to receive a user selection of operating status information to be obtained.

10. The non-transitory machine-readable storage medium of claim 9, wherein the instructions to obtain operating status information by monitoring the at least one property is based on the user selected operating status information.

11. The non-transitory machine-readable storage medium of claim 8, wherein the instructions for obtaining operating status information comprise a plurality of Dynamic Link Libraries (DLLs).

12. The non-transitory machine-readable storage medium of claim 11, wherein each one of the plurality of DLLs corresponds to a particular type of operating status information.

13. The non-transitory machine-readable storage medium of claim 8, wherein the operating status information includes one or more of battery status information, network status information, and power state information.

14. The non-transitory machine-readable storage medium of claim 8, further comprising:

instructions to transmit at least one handle to the server upon initiation of the remote desktop session, each handle identifying a particular type of operating status information to be subsequently transmitted to the server; and instructions to include a particular handle when transmitting the operating status information to the server, wherein the particular handle that is included identifies the particular type of operating status information.

15. The non-transitory machine-readable storage medium of claim 14, wherein the each handle is associated with a respective process that receives the particular type of operating status information for the respective process.

16. The non-transitory machine-readable storage medium of claim 8, further comprising:

instructions to transmit to the server that an indication that the selectable user interface element has been selected;

instructions to receive a returned notification from the server indicating that the selectable user interface element has been selected in the remote desktop session; and instructions to activate the interface element that is obscured based on the returned notification.

17. A method comprising:

receiving operating status information of a client via a channel of a remote desktop session established with the client, wherein the channel is dedicated to transmitting the operating status information, wherein the operating status information corresponds to an interface element displayed on the client that is currently obscured by the remote desktop session;

inserting a visual indication of the operating status information into a remote desktop graphical user interface (GUI), wherein the visual indication comprises a selectable user interface element that corresponds to the interface element that is currently obscured by the remote desktop session; and transmitting the remote desktop GUI including the visual indication to the client for display by the client in a window of the remote desktop session that obscures the interface element.

18. The method of claim 17, further comprising:

receiving an indication from the client that the selectable user interface element has been selected; and returning a notification to the client indicating that the selectable user interface element has been selected in the remote desktop session to cause the client to activate the interface element that is obscured based on the notification that is returned.

19. The method of claim 17, wherein the operating status information includes one or more of battery status information, network status information, and power state information.

20. The method of claim 17, further comprising:

receiving at least one handle from the client upon initiation of the remote desktop session, each handle identifying a corresponding type of operating status information to be transmitted to the server; and loading a respective process for the each handle, the respective process receiving the corresponding type of operating status information and outputting a corresponding visual indication based on the corresponding type of operating status information.

* * * * *